(12) United States Patent
Yasui et al.

(10) Patent No.: US 8,548,182 B2
(45) Date of Patent: Oct. 1, 2013

(54) AUXILIARY MEMBER FOR HEARING AID

(75) Inventors: Shinichi Yasui, Ehime (JP); Makoto Yagi, Ehime (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 13/266,580

(22) PCT Filed: May 23, 2011

(86) PCT No.: PCT/JP2011/002856
§ 371 (c)(1),
(2), (4) Date: Oct. 27, 2011

(87) PCT Pub. No.: WO2011/151989
PCT Pub. Date: Dec. 8, 2011

(65) Prior Publication Data
US 2012/0039498 A1    Feb. 16, 2012

(30) Foreign Application Priority Data

Jun. 4, 2010 (JP) .................................. 2010-128555
Jan. 12, 2011 (JP) .................................. 2011-003591

(51) Int. Cl.
H04R 25/00 (2006.01)
(52) U.S. Cl.
USPC .......................... 381/323; 381/322; 381/324
(58) Field of Classification Search
USPC .................. 381/60, 315, 322–324, 329–330; 181/128–135
See application file for complete search history.

(56) References Cited

U.S. PATENT DOCUMENTS

| 4,152,551 | A | 5/1979 | Hiller |
| 7,726,711 | B1 | 6/2010 | Steltzer |
| 2004/0062409 | A1 | 4/2004 | Batting |

FOREIGN PATENT DOCUMENTS

| JP | 59-228355 | 12/1984 |
| JP | 63-15564 | 2/1988 |
| JP | 8-84399 | 3/1996 |
| JP | 3148830 | 2/2009 |
| WO | 02/51203 | 6/2002 |
| WO | 2007/101439 | 9/2007 |
| WO | 2010/052345 | 5/2010 |

OTHER PUBLICATIONS

International Search Report issued Jun. 28, 2011 in International (PCT) Application No. PCT/JP2011/002856.
Written Opinion of the International Searching Authority issued Jun. 28, 2011 in International (PCT) Application No. PCT/JP2011/002856.
Extended European Search report issued Mar. 8, 2012 in corresponding European Application No. 11770033.

*Primary Examiner* — Suhan Ni
(74) *Attorney, Agent, or Firm* — Wenderoth, Lind & Ponack, L.L.P.

(57) ABSTRACT

This auxiliary member for a hearing aid comprises a main body case (1) having an insertion hole (3) of a hearing aid (2) on a top face, a hearing aid accommodating space (1A) provided to the portion corresponding to the insertion hole (3) inside this main body case (1), a holding member (15) that holds the hearing aid (2) accommodated in this hearing aid accommodating space (1A), a manipulation component (11) for manipulating this holding member (15), and an opening component (16) for opening a battery case (5) of the hearing aid (2) accommodated in the hearing aid accommodating space (1A).

23 Claims, 22 Drawing Sheets

AUXILIARY MEMBER FOR HEARING AID

TECHNICAL FIELD

The present invention relates to an auxiliary member for a hearing aid, which is used in replacing a battery installed in the hearing aid.

BACKGROUND ART

A primary cell called an air battery is mounted, for example, in a hearing aid, and this primary cell must be replaced about once a week when its voltage level drops.

However, since this primary cell is very small, measuring only a few millimeters in diameter, grasping the battery, removing it from the hearing aid, and replacing it with a new one can be a surprisingly challenging task for a hearing aid user (such as an elderly person).

In view of this, the pen-type hearing aid auxiliary member shown in Patent Literature 1, for example, has been proposed.

Specifically, with a conventional pen-type hearing aid auxiliary member, an electromagnet is mounted at the tip, and the battery is picked up and taken out of the hearing aid by the attractive force of this electromagnet.

Also, with an air battery, just opening up the air hole allows a chemical reaction with oxygen to proceed, and this gradually decreases the battery capacity. In view of this, it has been proposed, as in the following Patent Literature 2, that a switching means be opened and closed with a manipulation piece provided to the outer face of the main body case, so that the air hole of the air battery is opened and closed with a cover.

CITATION LIST

Patent Literature

Patent Literature 1: Utility Model Registration No. 3,148,830
Patent Literature 2: Japanese Laid-Open Patent Application S59-228355

SUMMARY

The pen-type hearing aid auxiliary member in the above-mentioned prior art is constituted such that the battery is picked up and removed from the hearing aid by the attractive force of an electromagnet. Accordingly, there is no need to grasp the small battery with the fingertips, which makes the job of replacing the battery much easier.

However, modern hearing aids continue to be smaller in size, so much so that even pulling out the battery case from the hearing aid can itself be challenging, and even if the above-mentioned conventional pen-type hearing aid auxiliary member featuring the attractive force of an electromagnet is utilized, replacement of the battery can be thwarted when the user tries to pull out the battery case.

In particular, when a hearing aid user such as an elderly person has to replace a battery in an unstable environment such as on a subway train, for example, the battery case has to be pulled out from the small hearing aid main body and the even smaller battery has to be replaced in a situation in which the user's hands are shaking, which can make it extremely difficult for the battery replacement to be carried out smoothly.

Also, when the technology disclosed in Patent Literature 2 is applied to a hearing aid, a manipulation piece is provided to the outer face of the main body case, but a reduction in the size of the hearing aid inevitably makes this manipulation piece smaller as well. Since the majority of hearing aid users are elderly, such small manipulation pieces are hard to handle, and as a result the hearing aid is harder to operate.

In view of this, it is an object of the present invention to make the work of replacing a battery easier.

It is a further object of the present invention to improve the storage life of an air battery.

SOLUTION TO PROBLEM

To achieve the stated object, the auxiliary member for a hearing aid of the present invention comprises a main body case, a hearing aid accommodating space, a holding member, and an opening component. The main body case has an insertion hole in a first face, for inserting a hearing aid. The hearing aid accommodating space is provided to a portion corresponding to the insertion hole inside the main body case. The holding member holds the hearing aid accommodated in the hearing aid accommodating space. The opening component opens a battery case of the hearing aid accommodated in the hearing aid accommodating space.

ADVANTAGEOUS EFFECTS

Because of the above constitution, the present invention makes the work of replacing a battery easier.

Specifically, with the present invention, after the battery case of the hearing aid has been opened in a state in which the first face is facing up, the main body case is turned upside-down so that the first face is facing down, and this allows the battery to fall under its own weight out of the opened battery case, thereby making the work of replacing the battery easier.

DESCRIPTION OF EMBODIMENTS

Embodiments of the hearing aid auxiliary member of the present invention will now be described in detail along with the drawings.

Embodiment 1

Figure 1:
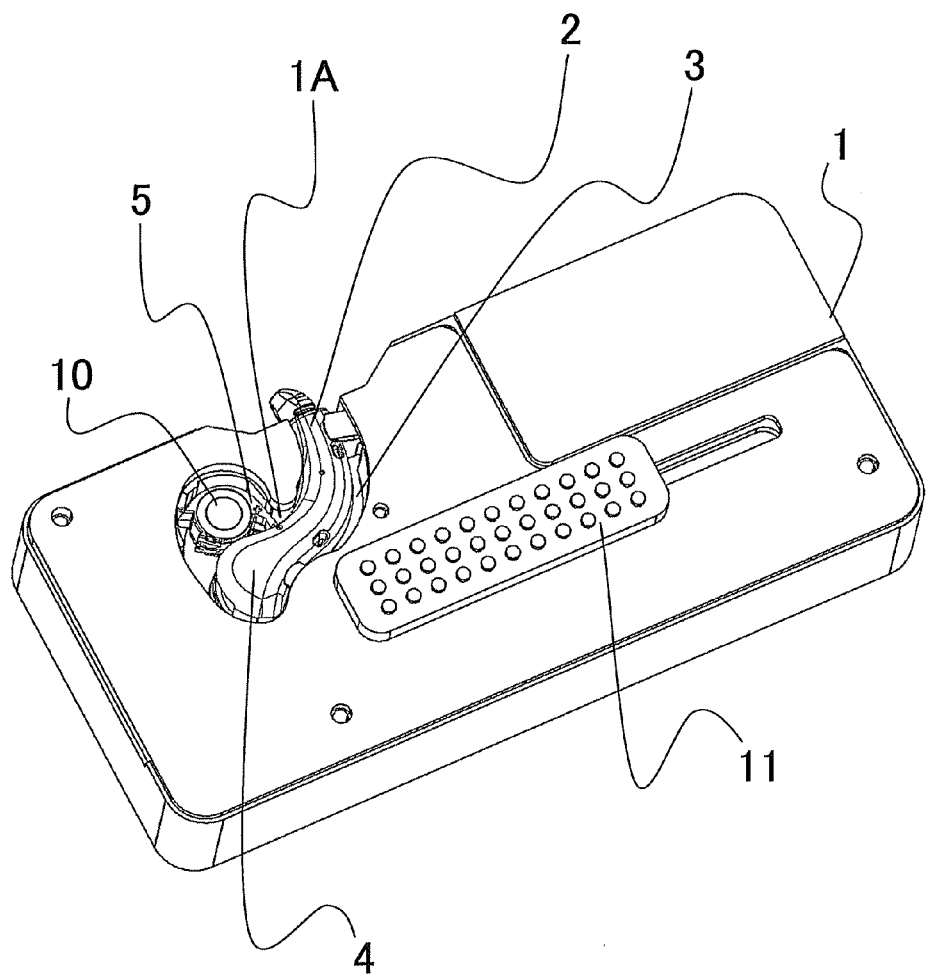
FIG. 1 is an oblique view of the hearing aid auxiliary member in Embodiment 1 of the present invention.

FIG. 1 is a diagram of the usage state of the hearing aid auxiliary member pertaining to an embodiment of the present invention, in which an insertion hole 3 of a hearing aid 2 is provided to the top face (first face) of a main body case 1 (in the form of a thin box) of a hearing aid auxiliary member.

Figure 2:
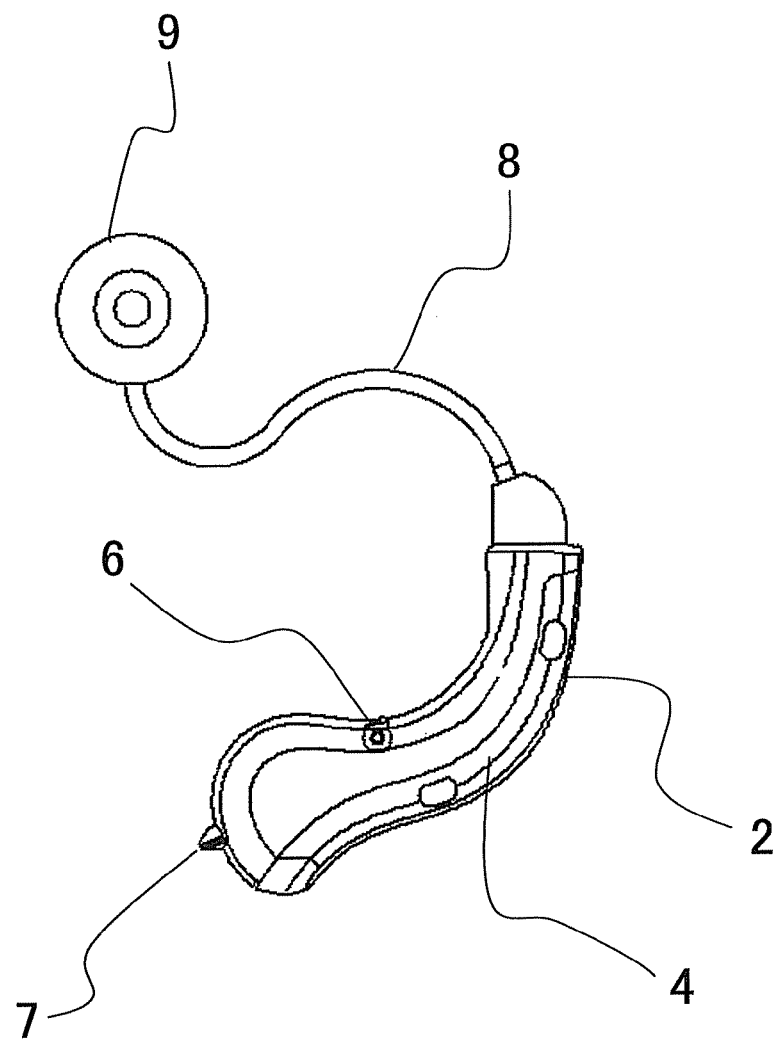
FIG. 2 is a top view of a hearing aid whose battery is being replaced using the hearing aid auxiliary member in FIG. 1.

As shown in FIG. 2, the hearing aid 2 is a behind-the-ear type, and a battery case 5 is accommodated, in a state of being openable and closeable by being rotated around an opening and closing shaft 6, under a hearing aid main body case 4 that is mounted at the back of the user's ear. The battery case 5 is opened and closed by manipulating an opening and closing prong 7 with a fingernail. A receiver 9 is linked via an over-the-ear tube 8 to the upper part of the hearing aid main body case 4.

In FIG. 1, a state is shown in which the over-the-ear tube 8 and the receiver 9 have been removed from the hearing aid main body case 4 in order to avoid making the drawing too complicated, but in an actual battery replacement, the over-the-ear tube 8 and the receiver 9 may be left mounted to the hearing aid main body case 4, or the over-the-ear tube 8 and the receiver 9 may be removed first.

As shown in FIG. 1, the insertion hole 3 of the main body case 1 is formed to match the shape of the hearing aid main body case 4, and has a concave portion that is slightly larger than the hearing aid main body case 4, and a concave portion that exposes the battery case 5 that has been opened up from the hearing aid main body case 4.

This will be described in detail below, but in replacing a battery 10 inside the battery case 5, first, as shown in FIG. 2, in a state in which the battery case 5 is accommodated in the hearing aid main body case 4, the hearing aid main body case 4 is placed in a hearing aid accommodating space 1A that communicates with the insertion hole 3 inside the main body case 1. Next, a manipulation component 11 is manipulated to pull out the battery case 5 from inside the hearing aid main body case 4.

Consequently, in this state, the main body case 1 is turned upside-down so that the insertion hole 3 faces down, and this causes the battery 10 to fall out under its own weight from the battery case 5, so it can be easily taken out.

Figure 3:
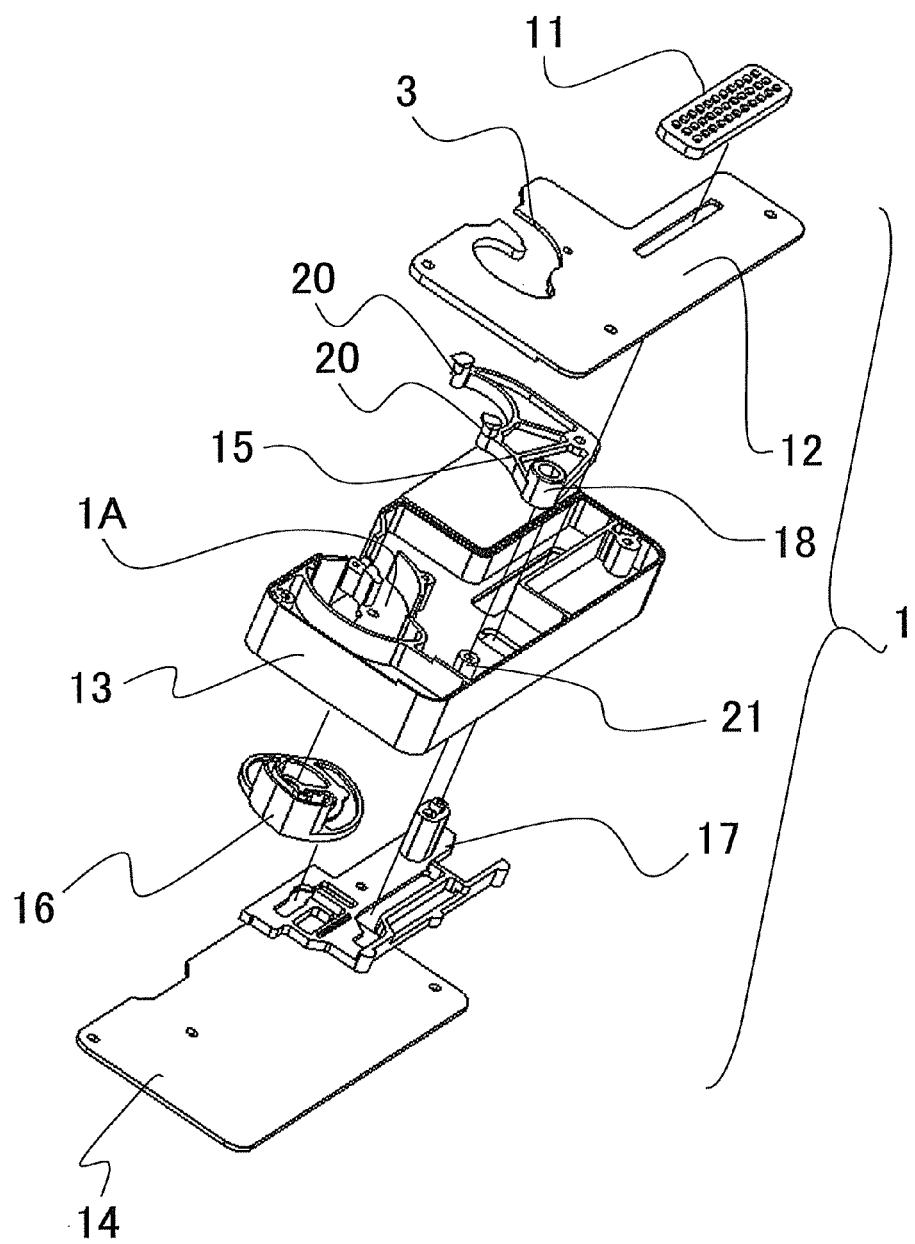
FIG. 3 is an exploded oblique view of the hearing aid auxiliary member in FIG. 1 as seen from the top face side.

With the hearing aid auxiliary member of this embodiment, the various parts shown in FIG. 3 and on are mounted inside the main body case 1 in order to perform the above operation.

Figure 4:
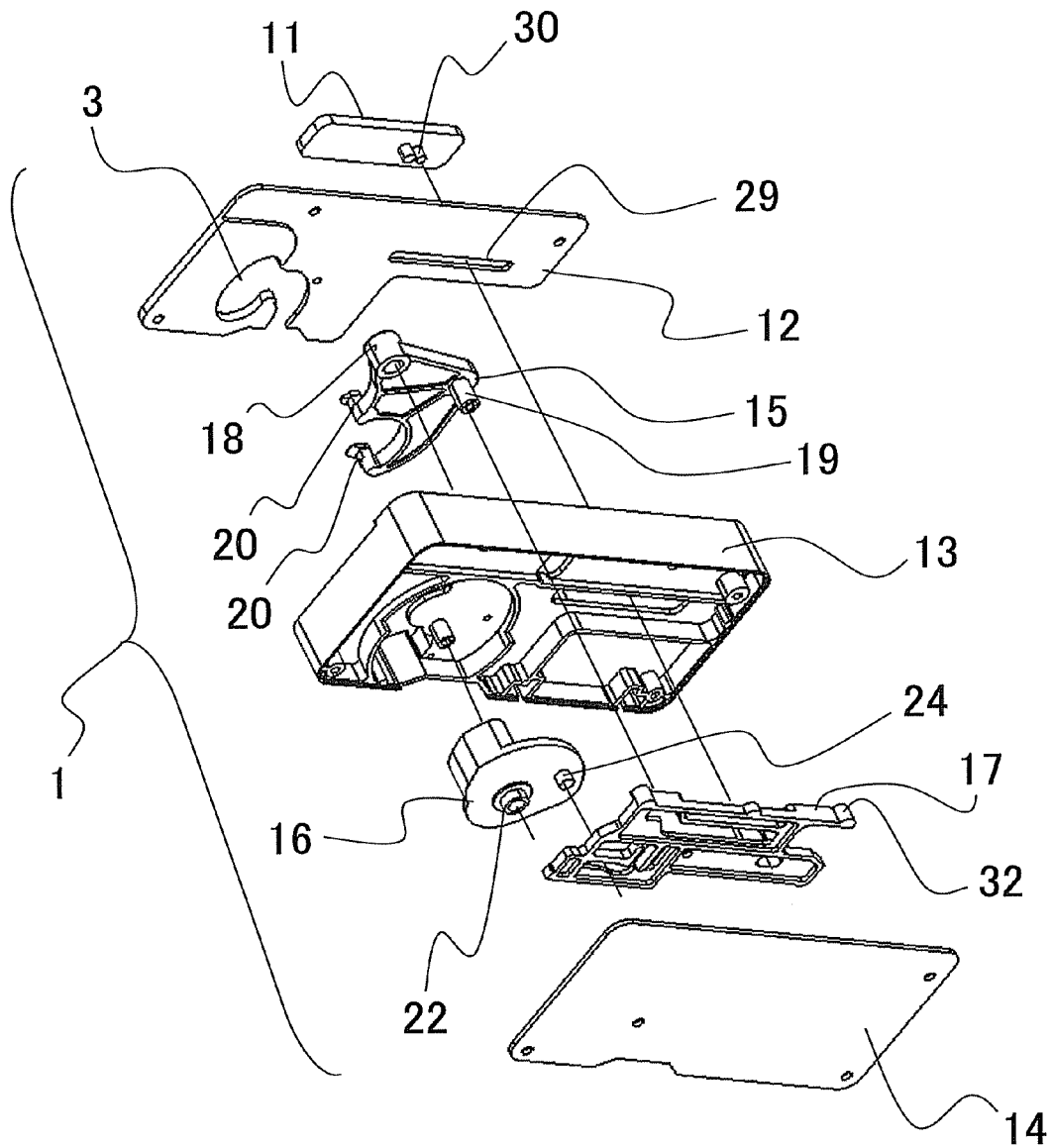
FIG. 4 is an exploded oblique view of the hearing aid auxiliary member in FIG. 1 as seen from the bottom face side.

As shown in FIGS. 3 and 4, the main body case 1 has an upper plate 12 (to which the insertion hole 3 is provided), a middle frame 13, and a lower plate 14 provided in that order from the top face side.

A holding member 15 is provided to the top face of the middle frame 13. An opening component 16 and a manipulation piece 17 are provided to the bottom face of the middle frame 13.

Figure 5:
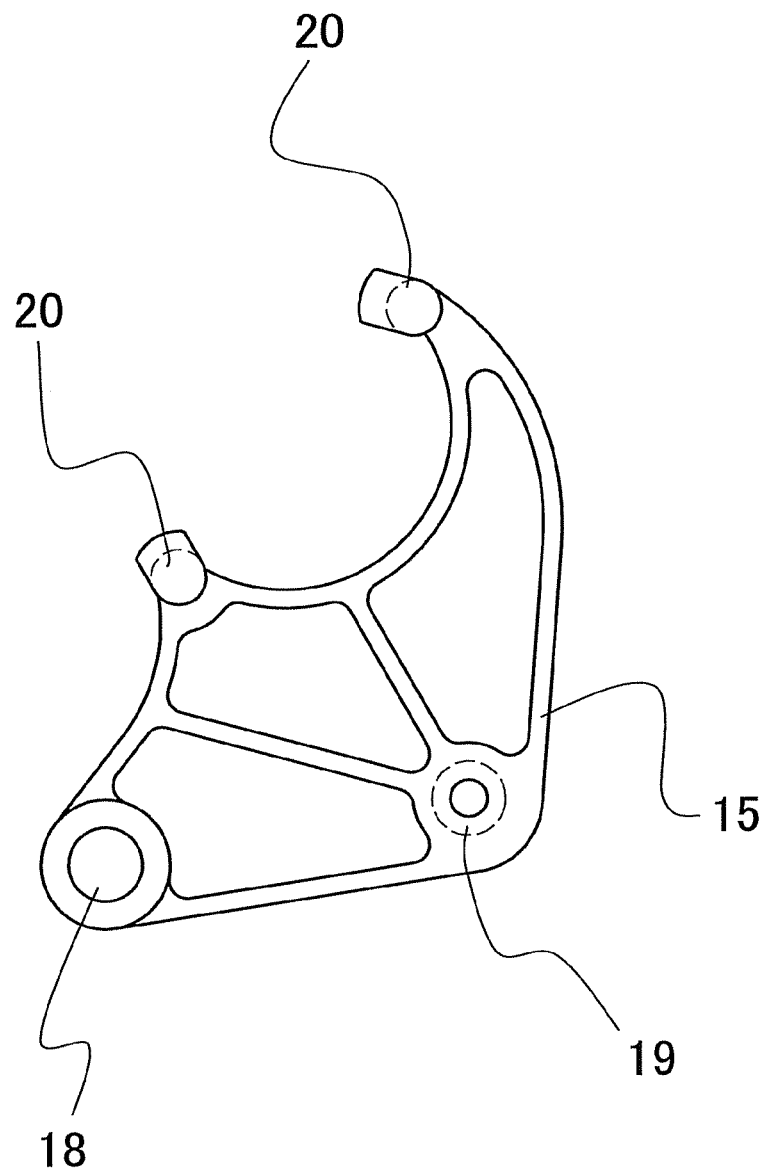
FIG. 5 is a top view of the main components of the hearing aid auxiliary member in FIG. 1.
Figure 6:
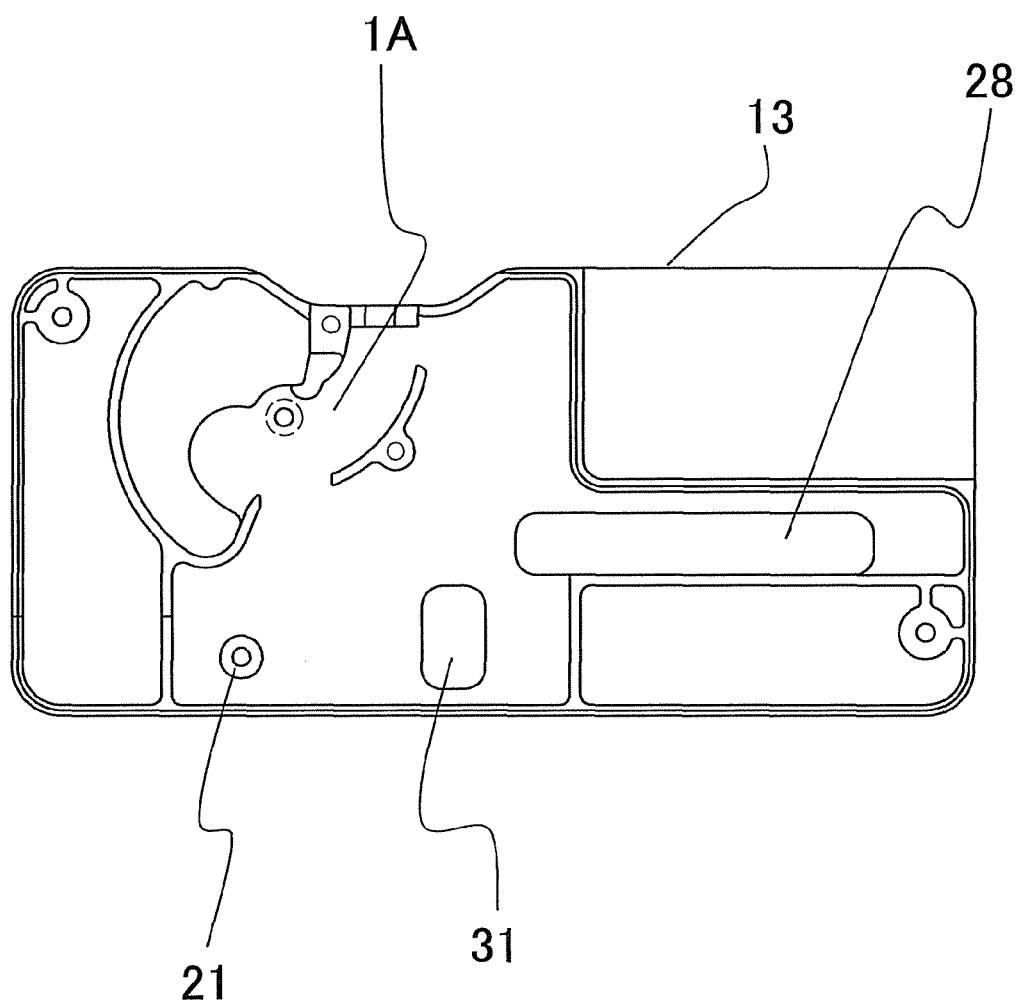
FIG. 6 is a top view of the main components of the hearing aid auxiliary member in FIG. 1.

As shown in FIG. 5, the holding member 15 has a substantially isosceles triangular shape. A holding member shaft support portion 18 is provided at one end of one of the sloped sides of the substantially isosceles triangular shape, a holding member sliding shaft 19 is provided at the other end of one sloped side, and two holding prongs 20 are provided at a specific spacing on the bottom side. The holding member shaft support portion 18 rotatably engages with the outer periphery of a rotary shaft 21 provided to the top face of the middle frame 13.

Figure 7:
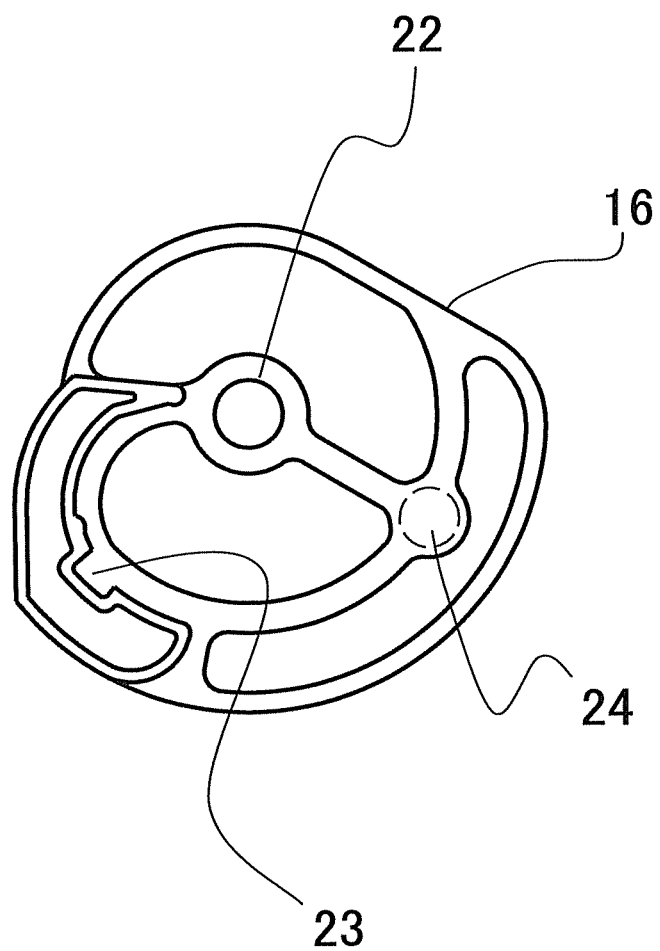
FIG. 7 is a top view of the main components of the hearing aid auxiliary member in FIG. 1.

As shown in FIG. 7, the opening component 16 has a substantially circular shape. The opening component 16 has an opening component shaft support portion 22 that is provided to the center portion of the substantially circular shape, an opening and closing concave portion 23 that accommodates the opening and closing prong 7 of the hearing aid 2 accommodated in the hearing aid accommodating space 1A around the outer periphery of the opening component shaft support portion 22, and an opening component sliding shaft 24 around the outer periphery of the opening component shaft support portion 22.

Figure 8:
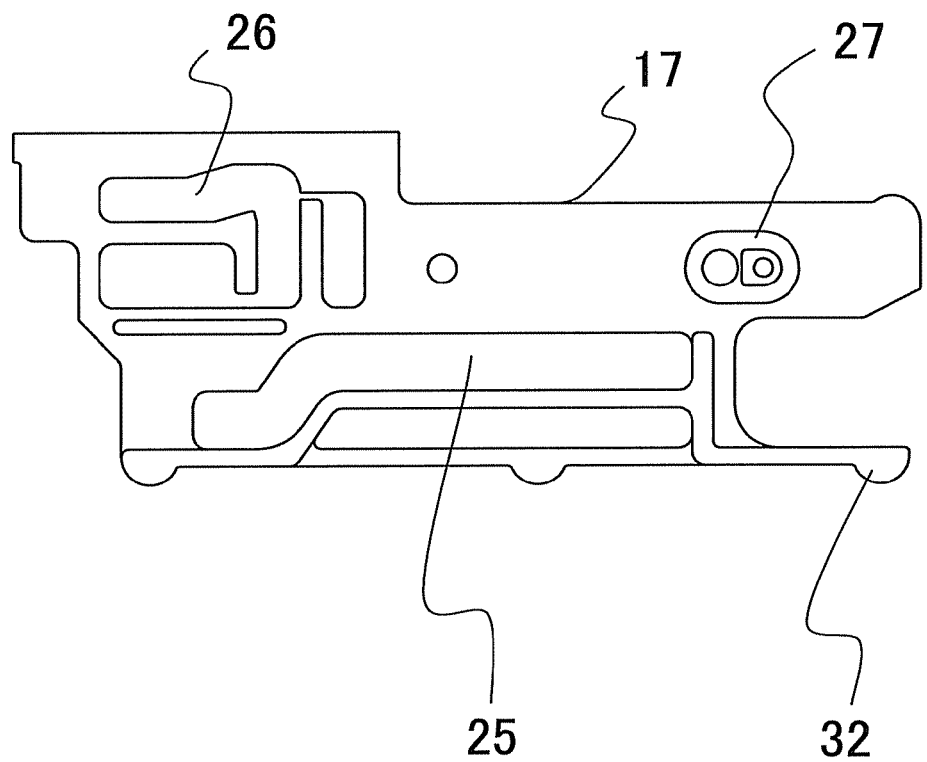
FIG. 8 is a top view of the main components of the hearing aid auxiliary member in FIG. 1.

As shown in FIG. 8, the manipulation piece 17 has a rectangular shape. The manipulation piece 17 has a first sliding groove 25 that guides the sliding of the holding member sliding shaft 19 and is provided along the lengthwise direction of the manipulation piece 17, and a second sliding groove 26 that guides the sliding of the opening component sliding shaft 24.

As shown in FIG. 8, the first sliding groove 25 is formed along the lengthwise direction of the main body case 1, and one end thereof (the right end in FIG. 8) is a continuous horizontal groove. The other end (the left end in FIG. 8) has a shape that gradually curves to the outer peripheral side of the main body case 1.

Also, the second sliding groove 26 is formed along a direction that is perpendicular to the first sliding groove 25 at one end (the right end in FIG. 8), and is formed parallel, from its middle to the other end (the left end in FIG. 8), with one end of the first sliding groove 25.

Also, a protrusion 27 for attaching the manipulation component 11 is provided to the manipulation piece 17. That is, the protrusion 27 of the manipulation piece 17 passes through a sliding groove 28 in the middle frame 13, and is disposed under a sliding groove 29 in the upper plate 12. In this state, as shown in FIG. 4, a protrusion 30 provided to the bottom face of the manipulation component 11 is passed through the sliding groove 29 and engaged with the protrusion 27.

The holding member sliding shaft 19 of the holding member 15 passes through a sliding groove 31 in the middle frame 13, and is engaged with the first sliding groove 25. The sliding groove 31 is formed along a direction that is perpendicular to the first sliding groove 25.

The opening component sliding shaft 24 of the opening component 16 is engaged with the second sliding groove 26.

Figure 9:
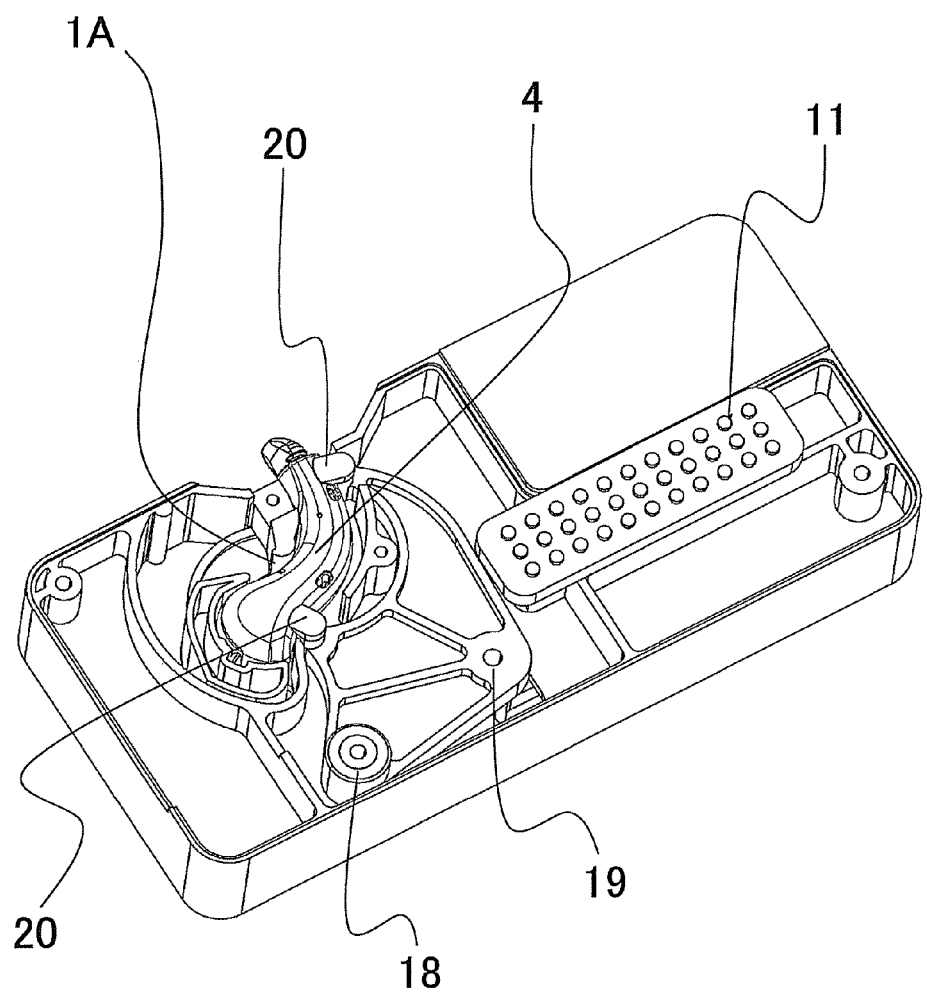
FIG. 9 is a partially cut-away oblique view of the operating state of the hearing aid auxiliary member in FIG. 1.

With the above constitution, when the battery 10 of the hearing aid 2 is to be replaced, as shown in FIG. 9, the hearing aid main body case 4 is placed in the hearing aid accommodating space 1A via the insertion hole 3. At this time, the holding prongs 20 has not yet appeared at the insertion hole 3.

That is, FIG. 9 shows a state in which the user has placed the hearing aid main body case 4 in the hearing aid accommodating space 1A and then started to push the manipulation component 11 to the insertion hole 3 side.

When the manipulation component 11 is thus pushed to the insertion hole 3 side, the manipulation piece 17 shown in FIG. 8 is pushed to the left in FIG. 9. As mentioned above, the holding member sliding shaft 19 of the holding member 15 is engaged with the first sliding groove 25 of the manipulation piece 17 at this point. Accordingly, when the manipulation piece 17 is pushed to the left in FIG. 9, the sliding of the holding member sliding shaft 19 of the holding member 15 is guided from the second end of the first sliding groove 25 to the first end.

Figure 10:
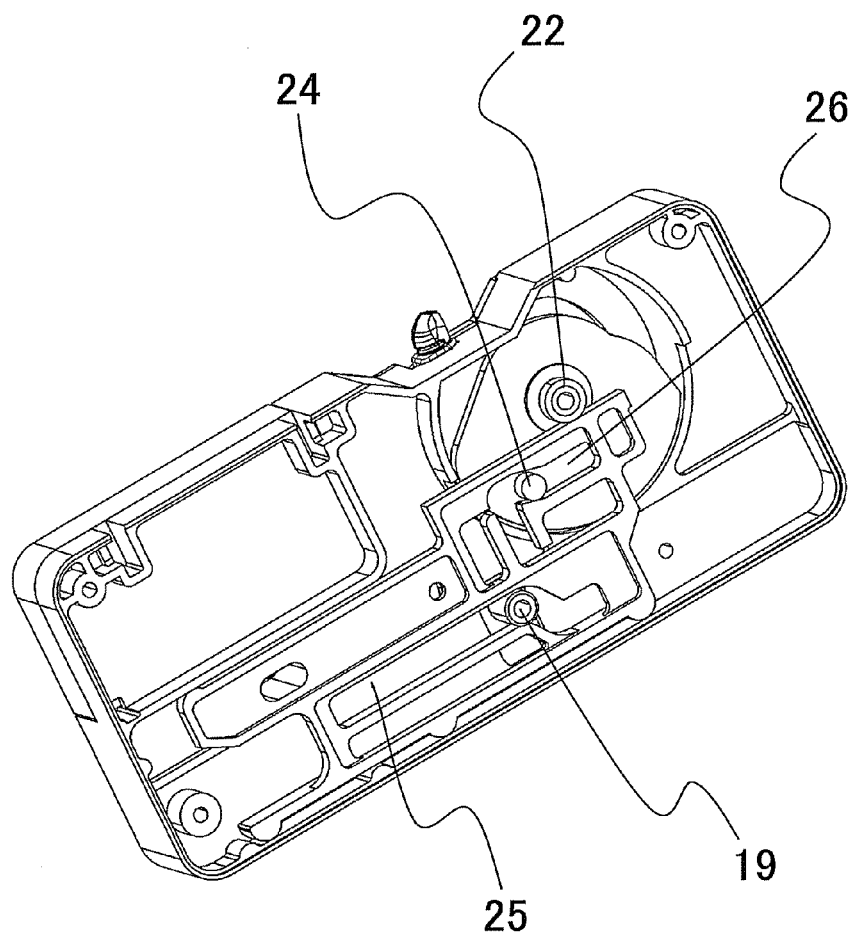
FIG. 10 is a partially cut-away oblique view of the operating state of the hearing aid auxiliary member in FIG. 1.

As shown in FIGS. 8, 9, and 10, at this point the holding member sliding shaft 19 rotates counter-clockwise around the holding member shaft support portion 18, so the holding prongs 20 are pushed out to the hearing aid main body case 4 side. Consequently, the hearing aid main body case 4 is held inside the hearing aid accommodating space 1A. At this point the opening component sliding shaft 24 of the opening component 16 has moved through the second sliding groove 26 to its middle portion.

Figure 11:
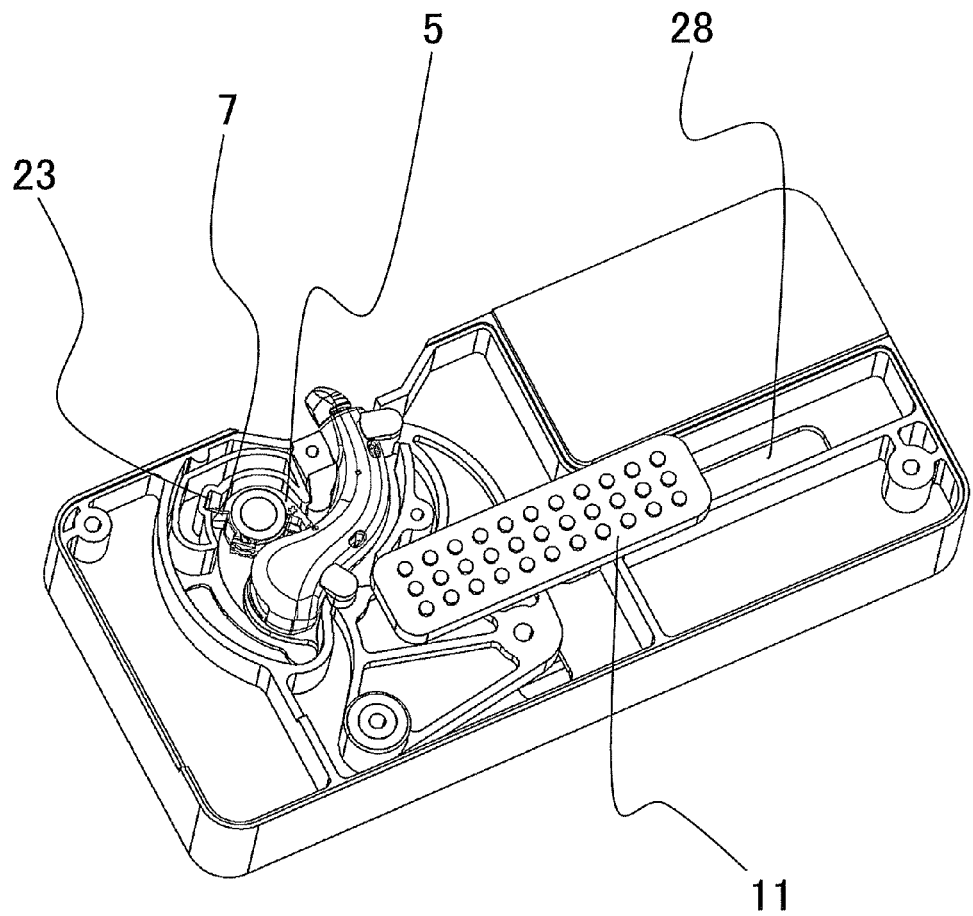
FIG. 11 is a partially cut-away oblique view of the operating state of the hearing aid auxiliary member in FIG. 1.
Figure 12:
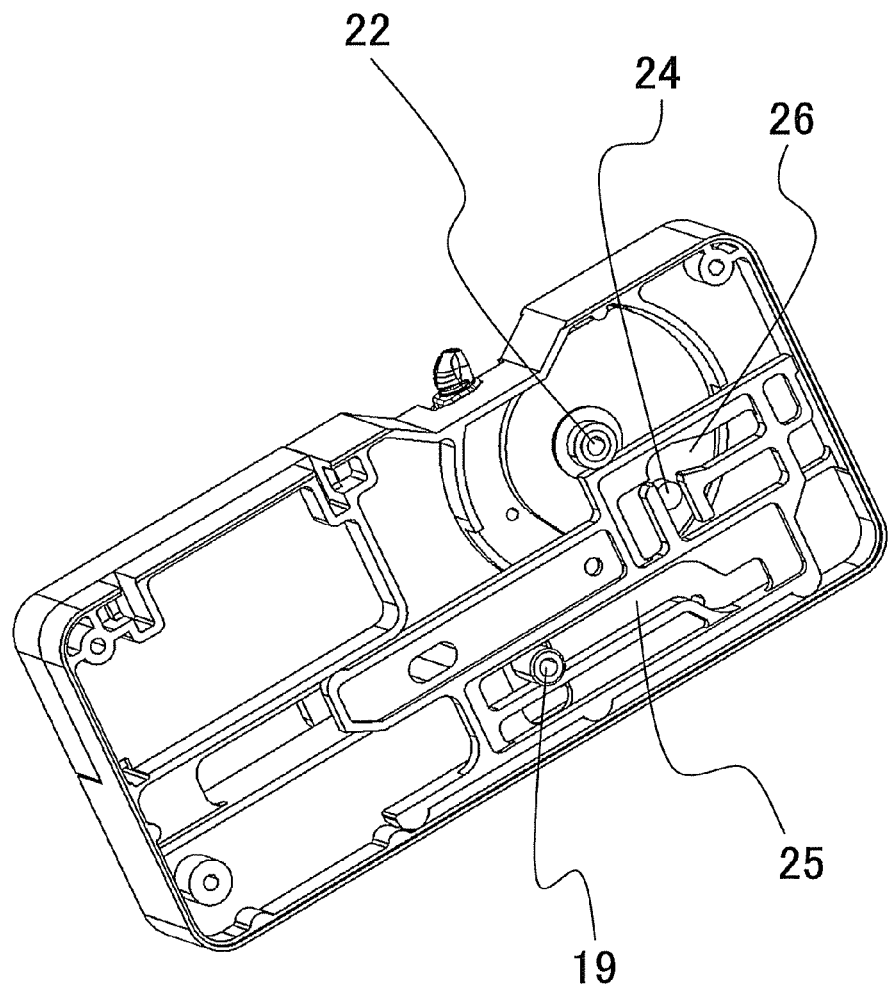
FIG. 12 is a partially cut-away oblique view of the operating state of the hearing aid auxiliary member in FIG. 1.

Then, as shown in FIG. 11, when the manipulation component 11 is pushed to the left, since the first end of the first sliding groove 25 is in a horizontal state, there is no change in the position of the holding member sliding shaft 19 of the holding member 15. That is, the hearing aid main body case 4 is in a state of being continuously held, but as mentioned above, the first end of the second sliding groove 26 is formed along a direction that is perpendicular to the first sliding groove 25. Accordingly, the opening component sliding shaft 24 of the opening component 16 guided by the first sliding groove 25 moves while bending to the first end side as shown in FIG. 12.

As a result of the opening component 16 rotating clockwise around the opening component shaft support portion 22, the opening and closing concave portion 23 also rotates clockwise as shown in FIG. 11. As a result, the opening and closing prong 7 engaged with the opening and closing concave portion 23 also rotates greatly clockwise, creating a state in which the battery case 5 is exposed within the insertion hole 3 as shown in FIG. 1. In this state, as shown in FIG. 13, if the main body case 1 is turned upside-down, the battery 10 will fall out of the battery case 5 under its own weight, making it easy to remove the battery 10.

Figure 13:
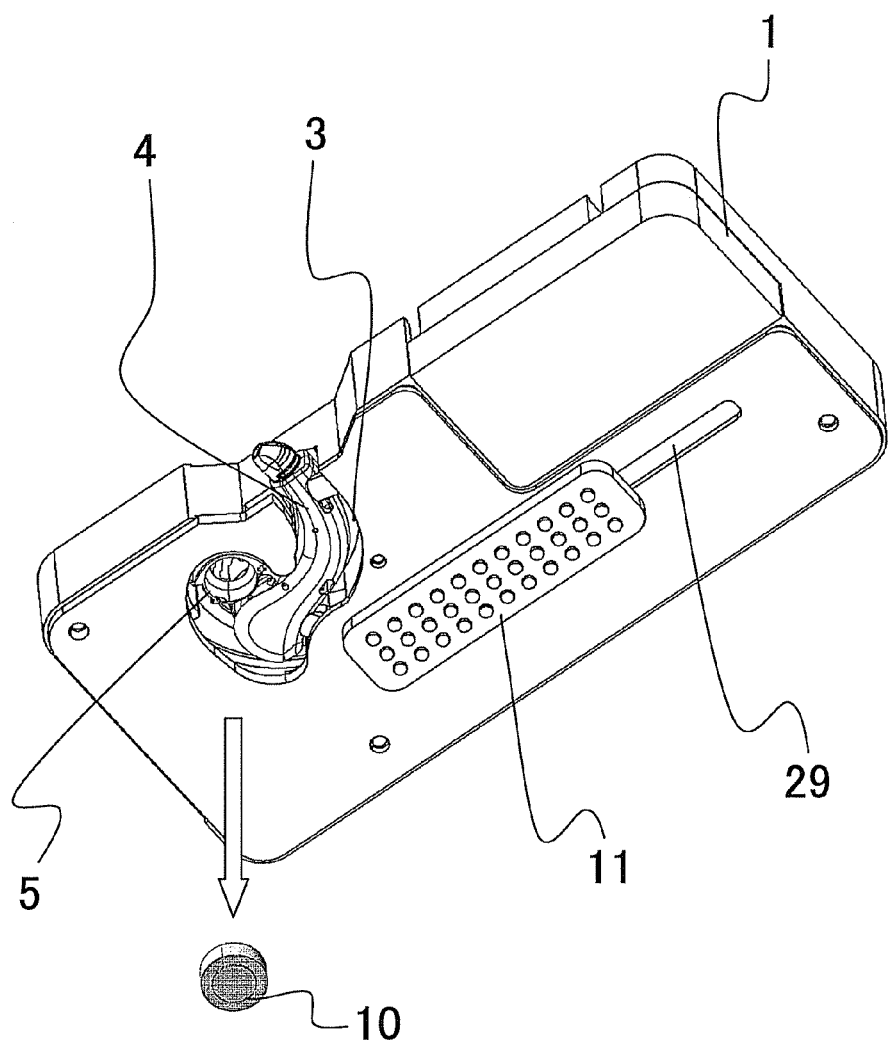
FIG. 13 is an oblique view of the operating state of the hearing aid auxiliary member in FIG. 1.

After this, the main body case 1 is returned from the state shown in FIG. 13, in which the insertion hole 3 faces down, to the state shown in FIG. 1, in which the insertion hole 3 is facing up. In this state, a new battery 10 is put into the battery case 5 appearing in the insertion hole 3. Furthermore, in this state, the manipulation component 11 moves away from the insertion hole 3, from a state in which the manipulation component 11 is closer to the insertion hole 3 (to the right in the drawing). As a result, the opening component sliding shaft 24 of the opening component 16 moves from a position along the widthwise direction of the main body case 1 in the second sliding groove 26 as shown in FIG. 12, via the bending point of the second sliding groove 26, and to a position along the lengthwise direction of the main body case 1 in the second sliding groove 26 as shown in FIG. 10. At this point, because of the elastic deformation of the various parts in the apparatus, etc., the second sliding groove 26 has a shape that does not bend completely at a right angle, but rather is deformed somewhat, so that the opening component sliding shaft 24 is moved a specific amount extra in a direction away from the first sliding groove 25 at this bending point, and after the opening component sliding shaft 24 has passed the bending point by a specific amount, it can be moved to the original rotation stroke end of the battery case 5. Consequently, the battery case 5 can be securely accommodated in the hearing aid main body, and the user will feel a click that indicates that this accommodation has been completed.

That is, when the opening component sliding shaft 24 of the opening component 16 is rotated counter-clockwise, the opening component 16 is manipulated by adding rotational force to the amount of rotation necessarily merely to close the battery case 5. Consequently, the battery case 5 can be moved such that it is securely accommodated in the hearing aid main body case 4.

After the closing of the battery case 5 is finished, the manipulation component 11 is moved further to the right in the drawing, which moves the manipulation piece 17 shown in FIG. 8 to the right in the drawing. Consequently, the holding member sliding shaft 19 of the holding member 15 engaged with the first sliding groove 25 moves from the state shown in FIG. 10 to the other end side shown in FIG. 8, that is, away from the second sliding groove 26. Consequently, the holding member 15 rotates clockwise around the holding member sliding shaft 19. As a result, the holding prongs 20 can be retracted from inside the insertion hole 3.

That is, the hold on the hearing aid main body case 4 by the holding prongs 20 is released, and this allows the hearing aid main body case 4, for which battery replacement is complete, to be removed from the hearing aid accommodating space 1A of the main body case 1. The clicking sensation when the manipulation piece 17 is moved to the left and right can be obtained by engaging a click sensation pin 32 shown in FIG. 8 with a protrusion (not shown) on the main body case 1.

Embodiment 2

Figure 14:
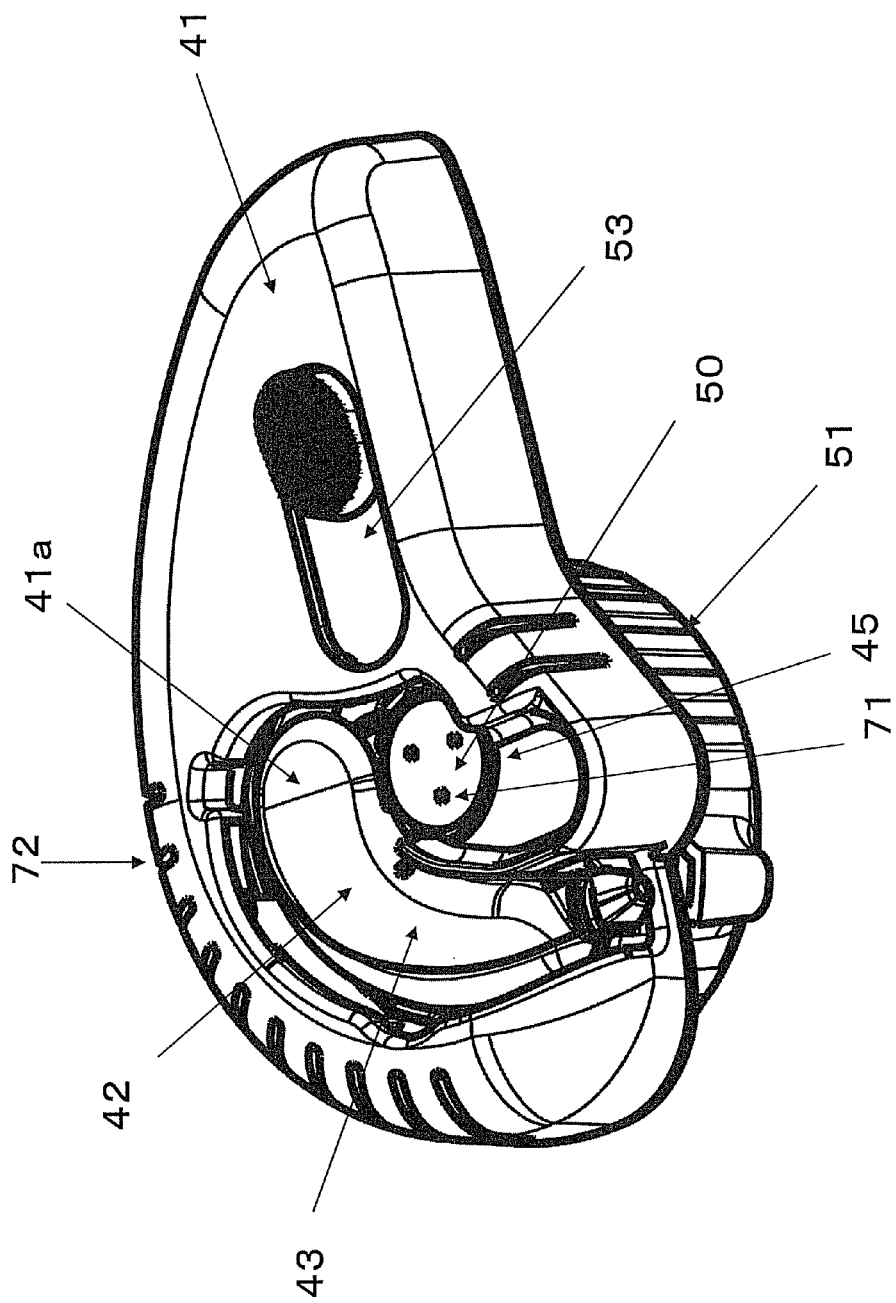
FIG. 14 is an oblique view of the hearing aid auxiliary member pertaining to Embodiment 2 of the present invention.

FIG. 14 is a diagram of the usage state of the hearing aid auxiliary member pertaining to Embodiment 2 of the present invention, in which an insertion hole 43 of a hearing aid 42 is provided to the top face (first face) of a main body case 41 of the hearing aid auxiliary member.

Figure 15:
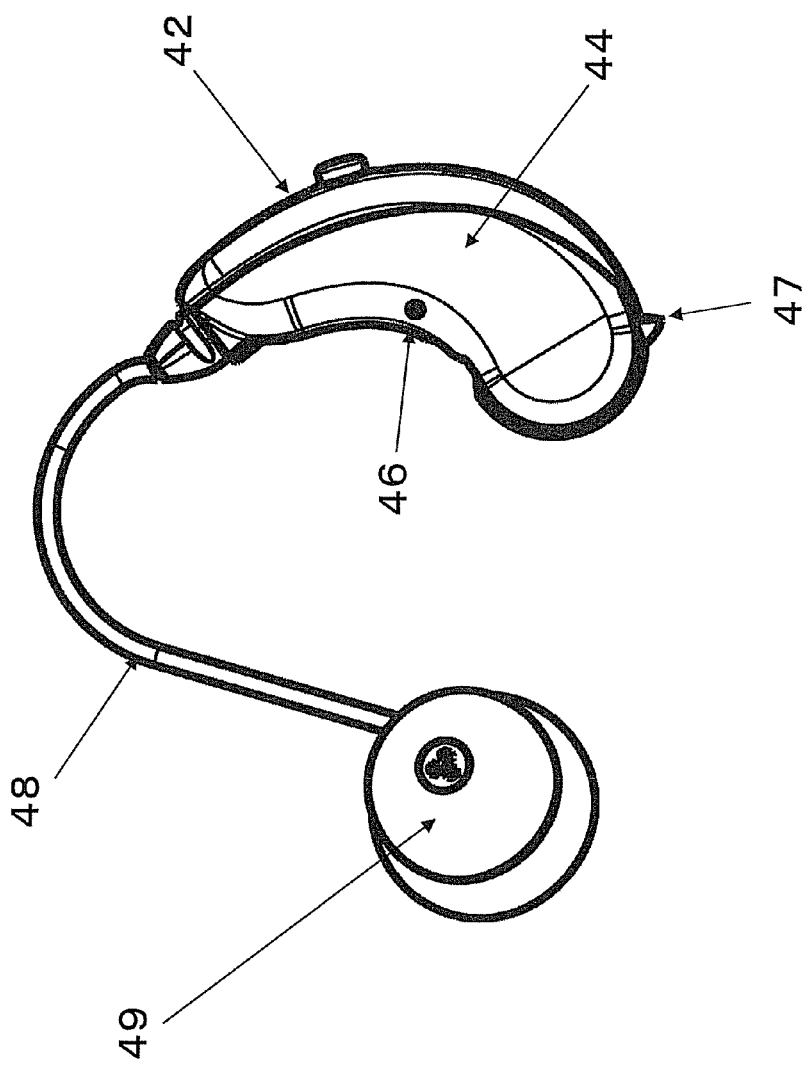
FIG. 15 is a top view of a hearing aid whose battery is being replaced using the hearing aid auxiliary member in FIG. 14.

As shown in FIG. 15, the hearing aid 42 is a behind-the-ear type, and a battery case 45 is accommodated, in a state of being openable and closeable by being rotated around an opening and closing shaft 46, under a hearing aid main body case 44 that is mounted at the back of the user's ear. The battery case 45 in this hearing aid 42 is opened and closed by manipulating an opening and closing prong 47 with a fingernail. An ear tip 49 is linked via an over-the-ear tube 48 to the upper part of the hearing aid main body case 44.

In FIG. 14, a state is shown in which the over-the-ear tube 48 and the ear tip 49 have been removed from the hearing aid main body case 44 in order to avoid making the drawing too complicated, but in an actual battery replacement, the over-the-ear tube 48 and the ear tip 49 may be left mounted to the hearing aid main body case 44, or the over-the-ear tube 48 and the ear tip 49 may be removed first.

As shown in FIG. 14, the insertion hole 43 of the main body case 41 is formed to match the shape of the hearing aid main body case 44, and has a concave portion that is slightly larger than the hearing aid main body case 44, and a concave portion that exposes the battery case 45 that has been opened up from the hearing aid main body case 44.

That is, in replacing an air battery 50 inside the battery case 45, first, as shown in FIG. 15, in a state in which the battery case 45 is accommodated in the hearing aid main body case 44, the hearing aid main body case 44 is placed in a hearing aid accommodating space 41a that communicates with the insertion hole 43 inside the main body case 41. Next, a manipulation component 51 is manipulated to rotate the battery case 45 around the opening and closing shaft 46 and pull the battery case 45 from inside the hearing aid main body case 44 to outside the hearing aid main body case 44.

Since a cover 52 (see FIG. 22) is closed at this point (the cover 52 is open in FIG. 14), a slide cover opening and closing component 53 is slid with a finger to the right in the drawing to expose the air battery 50, as shown in FIG. 14.

Accordingly, in this state, the main body case 41 shown in FIG. 14 is turned upside-down so that the insertion hole 43 faces down, and this allows the air battery 50 to fall under its own weight out of the battery case 45, so the battery can be easily removed.

Figure 16:
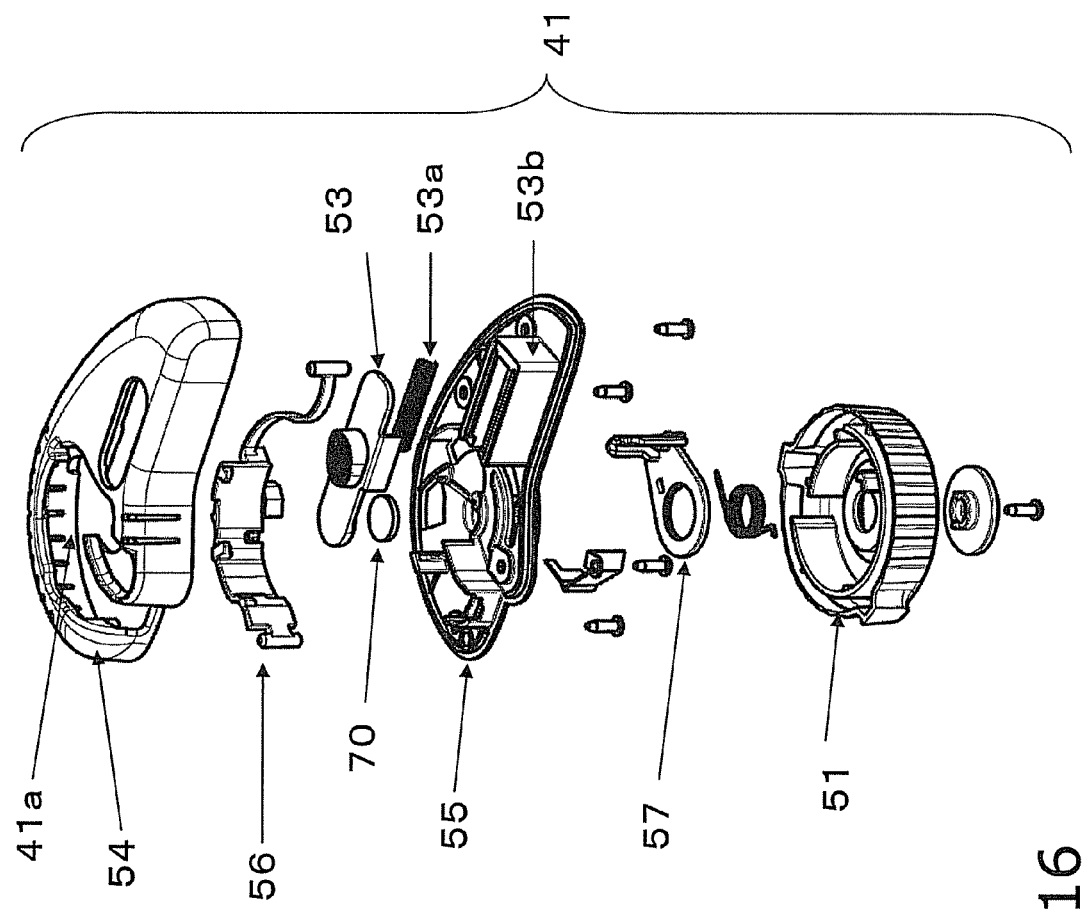
FIG. 16 is an exploded oblique view of the hearing aid auxiliary member in FIG. 14 as seen from the top face side.

To accomplish this operation, the various parts shown in FIG. 16 and on are mounted inside the main body case 41.

Figure 17:
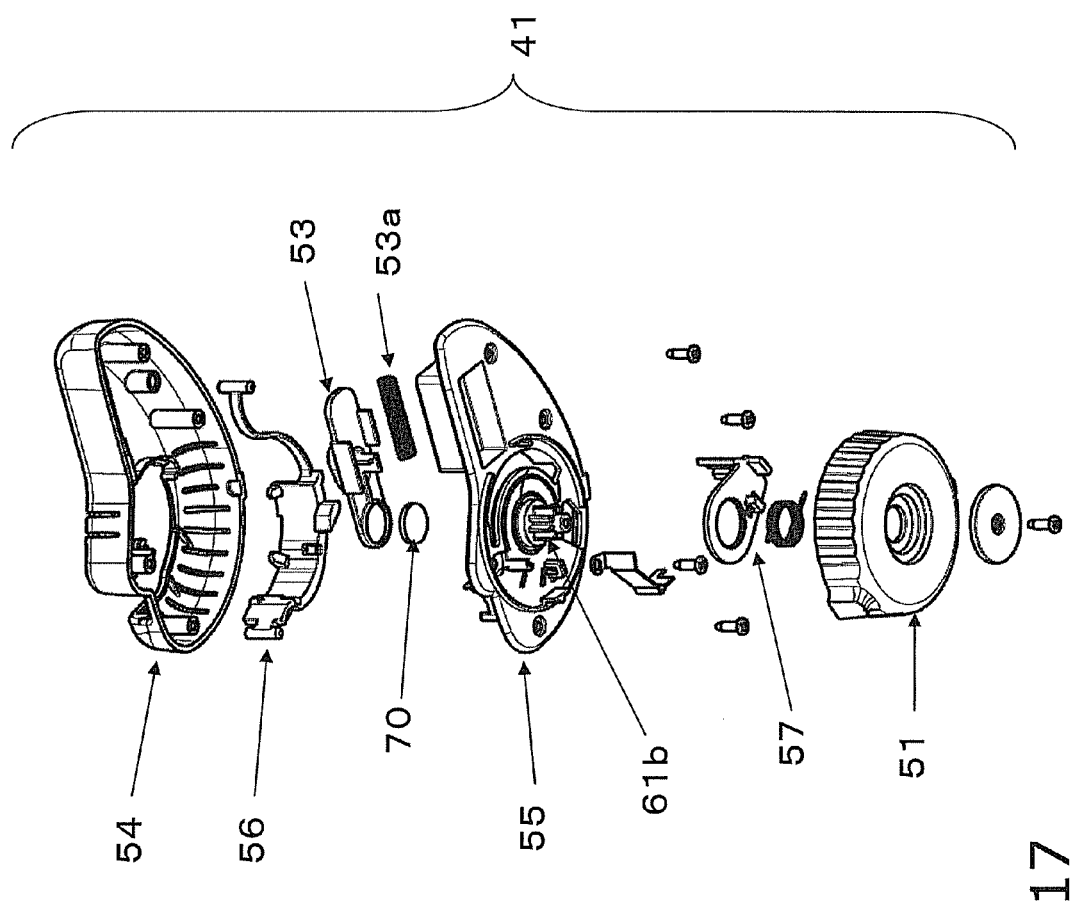
FIG. 17 is an exploded oblique view of the hearing aid auxiliary member in FIG. 14 as seen from the bottom face side.

As shown in FIGS. 16 and 17, the main body case 41 has an upper case 54 to which the insertion hole 43 is provided, and a frame 55.

A holding member 56, the slide cover opening and closing component 53, and a spring 53a are provided on the upper face side of the frame 55. An opening component 57 and the manipulation component 51 are provided on the lower face side of the frame 55.

Figure 18:
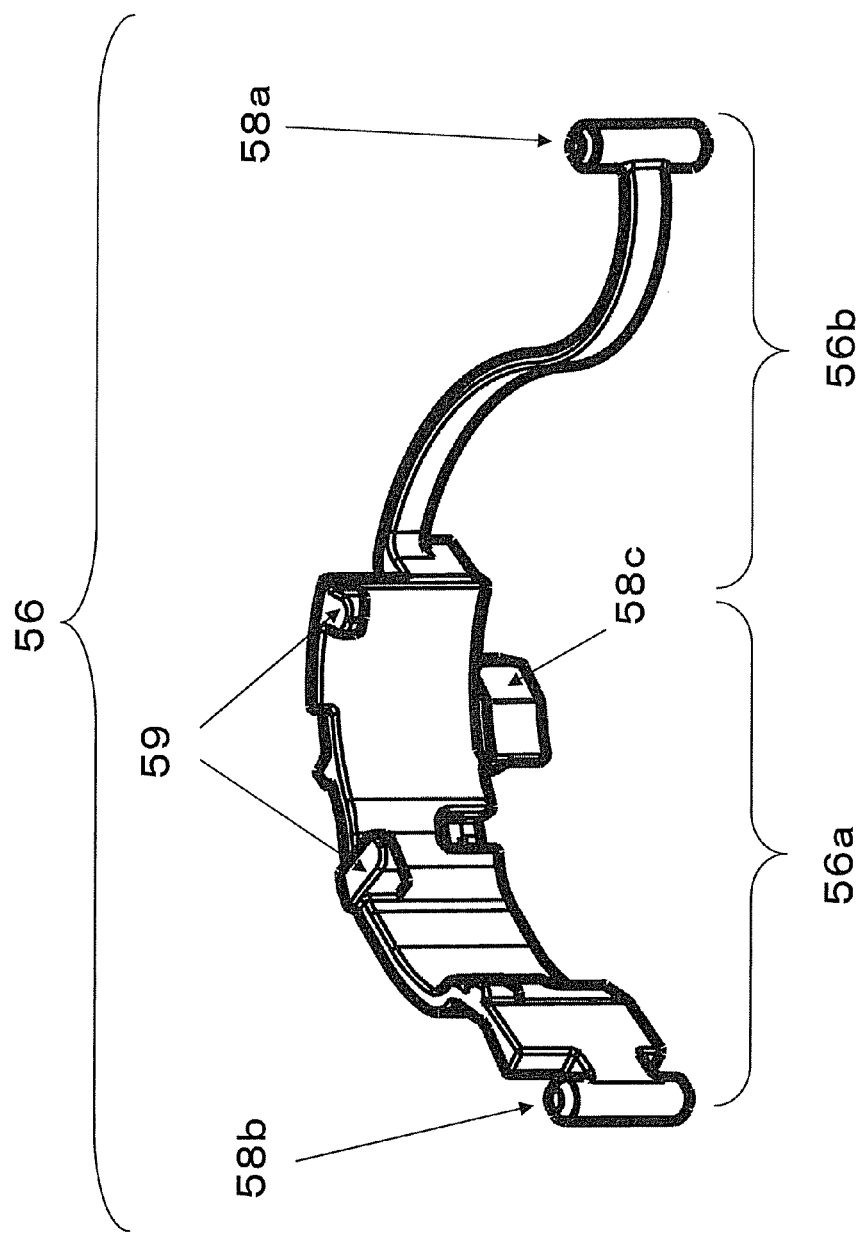
FIG. 18 is a top view of the main components of the hearing aid auxiliary member in FIG. 14.

As shown in FIG. 18, the holding member 56 is such that a substantially arc-shaped holder 56a and an S-shaped spring 56b are linked. A fixing component 58a that fixes the entire holding member 56, a rotary shaft 58b that serves as the rotational center in the rotation of the holder 56a, and a holding member sliding shaft 58c for rotating the holder 56a are provided at one end of the spring 56b.

Two support prongs 59 are provided facing inward, and at a specific spacing in order to support the main body case 41, on the inner peripheral face of the holder 56a. The holding member sliding shaft 58c passes through the frame 55 and is linked to the manipulation component 51 (discussed below). Thus, manipulating the manipulation component 51 causes the holding member sliding shaft 58c to move, allowing the holder 56a to be rotated around the rotational center of the rotary shaft 58b.

That is, the holding member 56 is held in the frame 55 by the fixing component 58a and the rotary shaft 58b provided to both ends of the holding member 56. The holder 56a rotates around the holding member sliding shaft 58c, during which the approximate center part of the holding member 56 deforms so that it bulges.

Consequently, the overall length of the holding member 56 in the spring 56b can be adjusted. Furthermore, as a result of this movement, the support prongs 59 are moved in or out of the hearing aid accommodating space 41a, which allows the hearing aid 42 accommodated in the hearing aid accommodating space 41a to be switched between a held state and an opened state.

Figure 19:
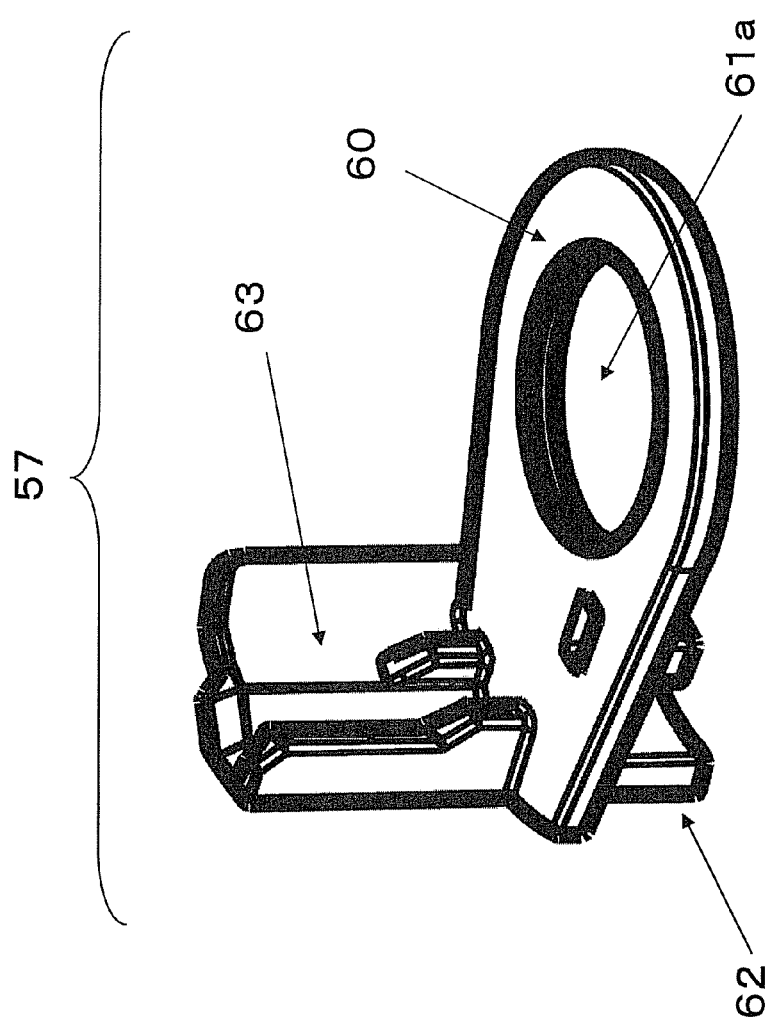
FIG. 19 is a top view of the main components of the hearing aid auxiliary member in FIG. 14.

As shown in FIG. 19, the opening component 57 has a substantially elliptical disk-shaped base component 60, an opening component shaft support portion 61a for rotating the base component 60, an opening component sliding shaft 62, and an opening and closing concave portion 63. The opening component sliding shaft 62 is provided to the rear face of the base component 60, and transmits the movement of the manipulation component 51 (discussed below). The opening and closing concave portion 63 engages with the opening and closing prong 47 provided to the surface of the base component 60, and opens and closes the battery case 45 in conjunction with the rotation of the base component 60.

The opening component 57 is installed so that the opening component shaft support portion 61a engages with a rotary shaft 61b. The opening and closing concave portion 63 passes through the frame 55 and is disposed inside the main body case 41. Also, the opening component sliding shaft 62 engages with the manipulation component 51 (discussed below), allowing it to rotate around the opening component shaft support portion 61a in conjunction with the movement of the manipulation component 51.

Figure 20:
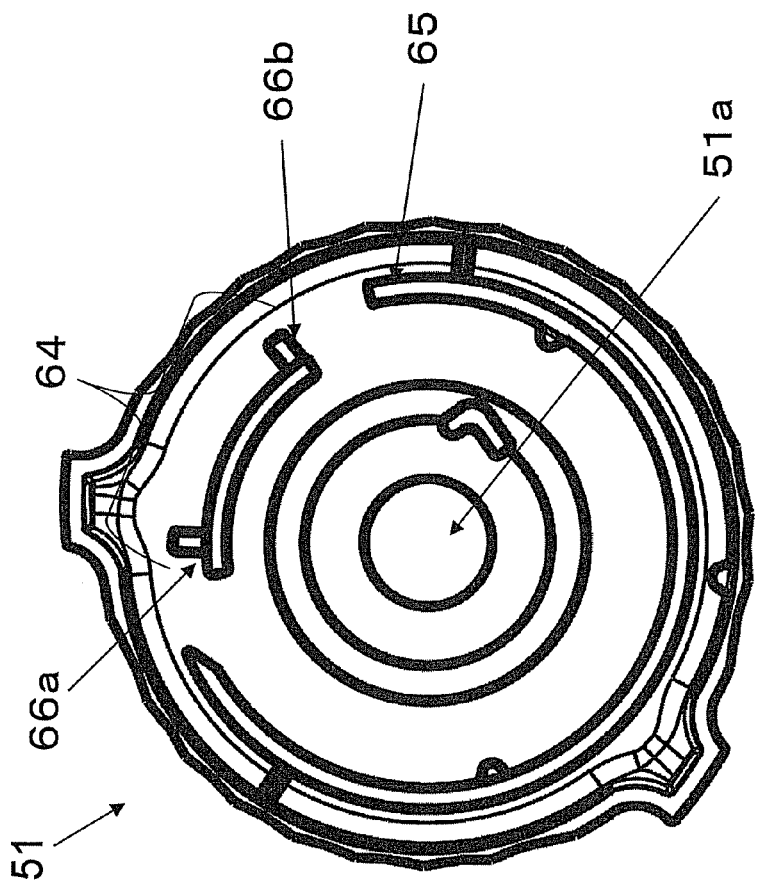
FIG. 20 is a top view of the main components of the hearing aid auxiliary member in FIG. 14.

As shown in FIG. 20, the manipulation component 51 has a sliding groove 64 and a rail 65.

A manipulation component rotation hole 51a provided in the middle of the manipulation component 51 engages with the rotary shaft 61b from the rear face side of the frame 55. Battery case opening and closing ribs 66a and 66b are provided at both ends of the sliding groove 64. The opening component 57 can be moved by rotating the manipulation component 51 further after it has been rotated until the opening component sliding shaft 62 of the opening component 57 hits the battery case opening and closing ribs 66a and 66b.

In the rotation of the manipulation component 51, the manipulation component 51 and the opening component 57 do not move in conjunction while the opening component sliding shaft 62 of the opening component 57 engaged with the sliding groove 64 is located between the battery case opening and closing ribs 66a and 66b. When the opening component sliding shaft 62 has reached one of the battery case opening and closing ribs 66a and 66b, the opening component 57 rotates in conjunction with the movement of the manipulation component 51. Consequently, the period during which the opening component sliding shaft 62 is located between the battery case opening and closing ribs 66a and 66b is termed a play range, and can be linked to movement of the holding member 56 (discussed below).

Next, since the holding member sliding shaft 58c does not ride up onto the rail 65 in a state of being located at one end of the rail 65 of the manipulation component 51, it is located more toward the outer periphery of the manipulation component 51. After this, when the manipulation component 51 is turned to the right, the holding member sliding shaft 58c rides up onto the rail 65 of the manipulation component 51. Consequently, the holding member sliding shaft 58c moves toward the center of the manipulation component 51.

Specifically, the holding member sliding shaft 58c can be operated reciprocally along the radial direction of the manipulation component 51 depending on whether or not the holding member sliding shaft 58c has ridden up onto the rail 65 of the manipulation component 51.

The reciprocal operation of the holding member sliding shaft 58c is linked to the movement of the holding member 56. That is, in a state in which the holding member sliding shaft 58c has not ridden up onto the rail 65, the support prongs 59 of the holding member 56 are in a state of having been retracted to the outside of the hearing aid accommodating space 41a (the opened state of the hearing aid 42). Also, in a state in which the holding member sliding shaft 58c has ridden up onto the rail 65, the support prongs 59 of the holding member 56 are in a state of protruding toward the inside of the hearing aid accommodating space 41a (the held state of the hearing aid 42).

In other words, with the hearing aid auxiliary member of this embodiment, the hearing aid 42 can be easily switched between its opened state (non-held state) and its held state by moving the support prongs 59 in or out of the hearing aid accommodating space 41a by rotary operation of the manipulation component 51.

Next, the joint movement of the holding member 56 and the base component 60 will be described through reference to FIGS. 21a and 21b.

Figure 21:
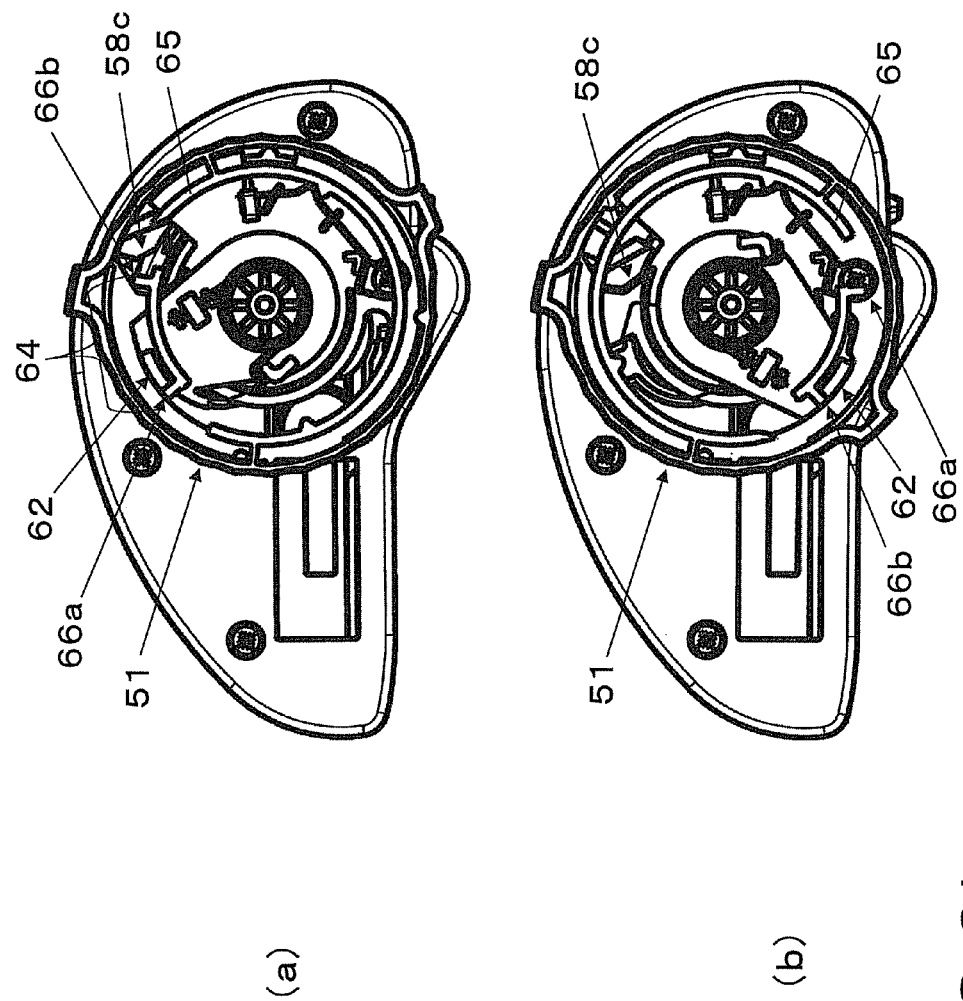
FIG. 21 consists of diagrams illustrating the state of the manipulation component of the hearing aid auxiliary member in FIG. 14.

FIG. 21a shows a state in which the hearing aid 42 has been put into the hearing aid accommodating space 41a, and the battery case 45 is accommodated in the hearing aid main body case 44. In this state, the opening component sliding shaft 62 is located at the left end (in the drawing) of the sliding groove 64, and the holding member sliding shaft 58c has not ridden up onto the rail 65. When the manipulation component 51 is rotated to the left (in the drawing) this state, the holding member sliding shaft 58c rides up onto the rail 65. Therefore, the holding member 56 protrudes into the hearing aid accommodating space 41a in order to hold the hearing aid 42. This held state is maintained even after the manipulation component 51 has been turned all the way counter-clockwise in FIG. 21.

Meanwhile, the operation of the manipulation component 51 is not linked to the opening component 57 until the opening component sliding shaft 62 touches the battery case opening and closing rib 66b protruding into the sliding groove 64. That is, as shown in FIG. 21b, after the opening component sliding shaft 62 hits the battery case opening and closing rib 66b, the manipulation component 51 is turned further in the counter-clockwise direction, and as a result the opening component sliding shaft 62 is pushed in the peripheral direction by the battery case opening and closing rib 66b.

Consequently, the opening component sliding shaft 62 moves in conjunction with the movement of the manipulation component 51, resulting in rotation by the opening component 57. Thus, the opening and closing concave portion 63 acts in the direction of opening the battery case 45, and the battery case 45 can be opened from the hearing aid main body case 44.

Thus, to pull out and open the battery case 45 from the hearing aid main body case 44, the manipulation component 51 is turned so that the hearing aid 42 is first held by the holding member 56. After this, the manipulation component 51 is turned further so that the battery case 45 is pulled out and opened from within the hearing aid main body case 44 by the opening component 57.

Next, FIG. 21b shows a state in which the hearing aid 42 has been put in the hearing aid accommodating space 41a, and the battery case 45 has been pulled out and opened from within the hearing aid main body case 44. In this state, the opening component sliding shaft 62 is located at the right end (in the drawing) of the sliding groove 64, and the holding member sliding shaft 58c rides up onto the rail 65. Specifically, since the holding member sliding shaft 58c rides up onto the rail 65, the hearing aid 42 is held by the holding member 56 in this state.

Next, when the manipulation component 51 is turned clockwise in FIG. 21b, the opening component sliding shaft 62 does not operate until it hits the battery case opening and closing rib 66a, so the battery case 45 remains in its opened state. After the opening component sliding shaft 62 hits the battery case opening and closing rib 66a, the manipulation component 51 is turned further clockwise in FIG. 21b, which results in the opening component sliding shaft 62 being pushed by the battery case opening and closing rib 66a, and the opening component sliding shaft 62 moves in conjunction with the movement of the manipulation component 51, thereby performing the rotation produced by the opening component 57. Consequently, the opening and closing concave portion 63 acts in the direction of closing the battery case 45, and the battery case 45 can be closed inside the hearing aid main body case 44.

After this, the holding member sliding shaft 58c moves away from the rail 65, so the hold on the hearing aid 42 by the holding member 56 is released.

Thus, in the operation of closing the battery case 45, a series of operations is performed wherein the manipulation component 51 is turned so that a state is maintained in which the hearing aid 42 is held by the holding member 56, while the battery case 45 is closed by the opening component 57, after which the hold on the hearing aid 42 by the holding member 56 is released.

In opening and closing the battery case 45, it is important to set the above-mentioned play range for the sliding groove 64 in order to prevent a delay in the movement of the holding member 56 and the opening component 57.

Figure 22:
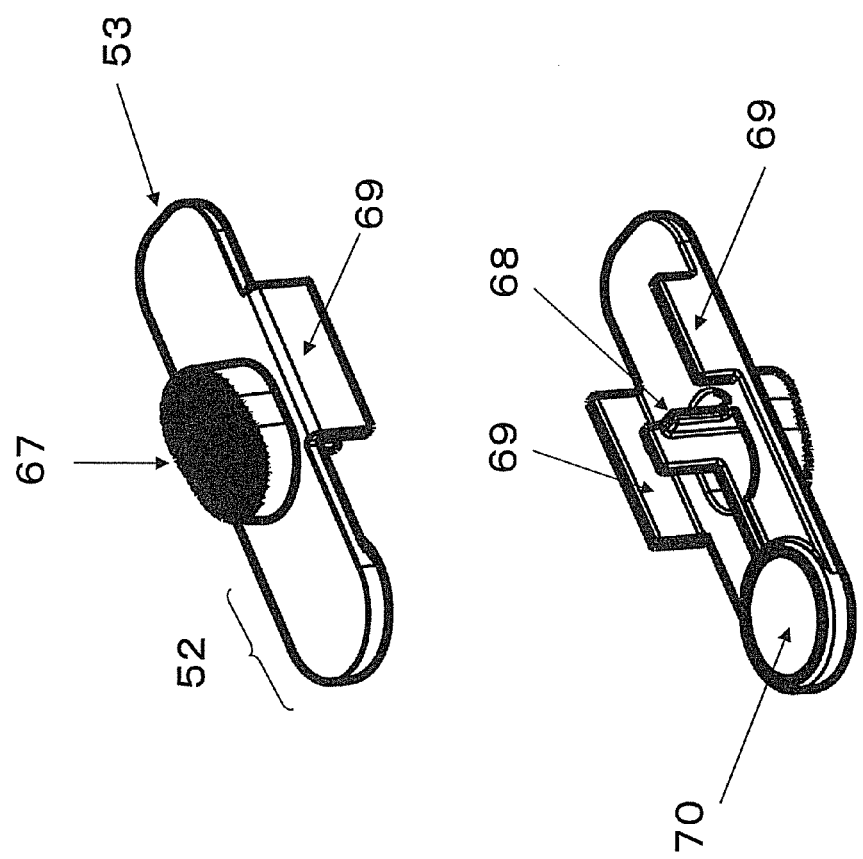
FIG. 22 is an oblique view of the main components of the hearing aid auxiliary member in FIG. 14.

Next, the slide cover opening and closing component 53 will be described through reference to FIG. 22.

The slide cover opening and closing component 53 has a substantially rectangular shape, and its short sides are arc shaped. Also, the slide cover opening and closing component 53 has a cover 52 that is provided at one end of the substantially rectangular shape and covers the front face of the opened battery case 45, and a finger tab 67 that is provided to the top face and is directly manipulated by the user's finger. The slide cover opening and closing component 53 further has a sliding rib 68 provided as a guide in the sliding operation of the slide cover opening and closing component 53, a retainer rib 69 for retaining the spring 53a that is used to keep the slide cover opening and closing component 53 in its closed state, and a magnet 70 provided to the rear face side of the cover 52.

The spring 53a is accommodated in a spring accommodation component 53b, and the slide cover opening and closing component 53 is disposed at the upper part thereof (see FIG. 16).

Here, the sliding rib 68 engages with the spring accommodation component 53b and guides the sliding of the slide cover opening and closing component 53. One end of the spring 53a is pressed against the retainer rib 69, so the slide cover opening and closing component 53 is normally held in its closed state.

In removing the air battery 50, as discussed above, the hearing aid 42 is put into the hearing aid accommodating space 41a, and the battery case 45 is opened up from the hearing aid main body case 44, after which the finger tab 67 is held down with a finger, and the slide cover opening and closing component 53 is moved to the right in FIG. 14. Consequently, the air battery 50 is exposed on the surface of the main body case 41. Thus, in this state, the air battery 50 can be easily taken out if the main body case 41 is turned upside-down.

Also, in a state in which the battery case 45 is open and the cover 52 is closed, the air battery 50 is attracted by the magnetic force of the magnet 70 provided to the rear of the cover 52. As shown in FIG. 14, the air battery 50 installed in the hearing aid 42 is installed so that an air hole 71 is at the top. Thus, when the battery is attracted by the magnet 70 in this state, the air hole 71 can be blocked off by the magnet 70, which minimizes consumption of the air battery 50.

Also, a vent hole 72 that communicates between the outside air and the hearing aid 42 accommodated in the main body case 41 is provided to the main body case 41.

Consequently, even if the main body case 41 is put directly into a drying case in a state in which the hearing aid 42 is accommodated in the main body case 41, the hearing aid 42 in the main body case 41 can still be dried. Also, in this held state, leaving the battery case 45 in its opened state allows the air hole 71 of the air battery 50 to be blocked off by the magnet 70 of the slide cover opening and closing component 53, so consumption of the air battery 50 during storage can be minimized.

Other Embodiments (A)

In Embodiment 1 above, an example was described in which the holding member 15 that supported the hearing aid 2 had the function of holding or opening the hearing aid 2 accommodated in the hearing aid accommodating space 1A by advancing or retracting in conjunction with the manipulation of the manipulation component 11, but the present invention is not limited to this.

For instance, as a structure that may be used instead of this holding member 15, a holding member may be constituted by an elastic member provided to the inner wall face so that the size of the inner wall face of the hearing aid accommodating space 1A is smaller than the outer periphery of the hearing aid 2.

This allows the hearing aid 2 to be held by the elastic force of the elastic member, merely by press-fitting the hearing aid 2 into the hearing aid accommodating space 1A.

In this case, there is no need for the operation of the holding member 56 by manipulation of the manipulation component 11, and the opening and closing of the battery case 5 can be accomplished by the opening component 16 alone, so battery replacement can be simplified.

The same constitution can also be applied to Embodiment 2 above.

(B)

In Embodiment 2 above, an example was described in which the cover 52 was designed so that it could open and close, with the cover 52 being opened when the air battery 50 was to be taken out, and closed when the air battery 50 was to be stored, but the present invention is not limited to this.

For instance, when the intended use as just as a hearing aid storage member that does not take battery replacement into account, the opening and closing mechanism for the cover 52 may be eliminated, so that the cover is always disposed on the front face of the battery case when opened.

(C)

In the above embodiments, a behind-the-ear type of hearing aid was described as the hearing aid for which battery replacement was performed, but the present invention is not limited to this.

For instance, the present invention can of course also be applied to an in-the-ear type of hearing aid or the like.

INDUSTRIAL APPLICABILITY

With the present invention, the work entailed by battery replacement is easier, so the present invention can be widely applied to the replacement of the battery in various kinds of hearing aid that require battery replacement.

REFERENCE SIGNS LIST 1 main body case
1A hearing aid accommodating space
2 hearing aid
3 insertion hole
4 hearing aid main body case
5 battery case
6 opening and closing shaft
7 opening and closing prong
8 over-the-ear tube
9 receiver
10 battery
11 manipulation component
12 upper plate
13 middle frame
14 lower plate
15 holding member
16 opening component
17 manipulation piece
18 holding member shaft support portion
19 holding member sliding shaft
20 holding prong
21 rotary shaft
22 opening component shaft support portion
23 opening and closing concave portion
24 opening component sliding shaft
25 first sliding groove
26 second sliding groove
27 protrusion
28 sliding groove
29 sliding groove
30 protrusion
31 sliding groove
32 click sensation pin
41 main body case
41a hearing aid accommodating space
42 hearing aid
43 insertion hole
44 hearing aid main body case
45 battery case
46 opening and closing shaft
47 opening and closing prong
48 over-the-ear tube
49 ear tip
50 air battery
51 manipulation component
51a manipulation component rotation hole
52 cover
53 slide cover opening and closing component
53a spring
53b spring accommodation component
54 upper case
55 frame
56 holding member
56a holder
56b spring
57 opening component
58a fixing component
58b rotary shaft
58c holding member sliding shaft
59 support prong
60 base component
61a opening component shaft support portion
61b rotary shaft
62 opening component sliding shaft
63 opening and closing concave portion
64 sliding groove
65 rail
66a, 66b battery case opening and closing rib
67 finger tab
68 sliding rib
69 retainer rib
70 magnet
71 air hole
72 vent hole

The invention claimed is:
1. An auxiliary member for a hearing aid, comprising:
a main body case having an insertion hole in a first face thereof, for inserting a hearing aid;

a hearing aid accommodating space provided to a portion corresponding to the insertion hole inside the main body case;

a holding member that holds the hearing aid accommodated in the hearing aid accommodating space; and an opening component that opens a battery case of the hearing aid accommodated in the hearing aid accommodating space such that a battery in the battery case is capable of falling out of the battery case in a state in which the insertion hole faces downward.

2. The auxiliary member for a hearing aid according to claim 1, further comprising:

a manipulation component that manipulates the holding member so as to switch between a state in which the hearing aid is held in the hearing aid accommodating space and a state in which the hearing aid is not held in the hearing aid accommodating space.

3. The auxiliary member for a hearing aid according to claim 2, wherein the opening component opens the battery case of the hearing aid accommodated in the hearing aid accommodating space after the holding member has been manipulated with the manipulation component.

4. The auxiliary member for a hearing aid according to claim 3, wherein the opening component is opened with the manipulation component.

5. The auxiliary member for a hearing aid according to claim 2, further comprising a manipulation piece that links the manipulation component, the holding member, and the opening component, and that is provided inside the main body case.

6. The auxiliary member for a hearing aid according to claim 2, wherein the holding member has a holding member sliding shaft, the opening component has an opening component sliding shaft, there is further provided a manipulation piece that links the manipulation component, the holding member, and the opening component, and that is provided inside the main body case, and the manipulation piece has:

a first sliding groove that guides the sliding of the holding member sliding shaft; and a second sliding groove that guides the sliding of the opening component sliding shaft.

7. The auxiliary member for a hearing aid according to claim 2, wherein the manipulation component is provided rotatably on the first face of the main body case.

8. The auxiliary member for a hearing aid according to claim 2, wherein the manipulation component is provided slidably on the first face of the main body case.

9. The auxiliary member for a hearing aid according to claim 1, wherein the holding member has:

a holding member shaft support portion that has the rotational center; and a holding prong that moves so as to protrude or retract with respect to the hearing aid accommodated in the hearing aid accommodating space.

10. The auxiliary member for a hearing aid according to claim 9, wherein the holding member has a holding member sliding shaft that moves the holding prong by sliding in a specific direction in rotating around the holding member shaft support portion.

11. The auxiliary member for a hearing aid according to claim 1, wherein the opening component has:

an opening component shaft support portion that serves as the rotational center; and an opening/closing concave portion that accommodates a battery cover opening/closing prong for the hearing aid accommodated in the hearing aid accommodating space, on the outer periphery of the opening component shaft support portion.

12. The auxiliary member for a hearing aid according to claim 11, wherein the opening component has an opening component sliding shaft that moves the battery cover opening/closing prong by sliding in a specific direction in rotating around the opening component shaft support portion.

13. The auxiliary member for a hearing aid according to claim 6, wherein the manipulation component has a rail that guides the sliding of the holding member sliding shaft of the holding member, and a sliding groove that guides the sliding of the opening component sliding shaft of the opening component.

14. The auxiliary member for a hearing aid according to claim 1, wherein the holding member is formed by an elastic material provided inside the hearing aid accommodating space, along the insertion hole so that the insertion hole is smaller than the hearing aid outer periphery.

15. The auxiliary member for a hearing aid according to claim 14, further comprising a manipulation component for manipulating the opening component.

16. The auxiliary member for a hearing aid according to claim 1, further comprising a cover provided to a front face of the battery case of the hearing aid accommodated in the hearing aid accommodating space in a state in which the battery case has been opened.

17. The auxiliary member for a hearing aid according to claim 16, wherein the cover can be opened and closed between the position of the front face of the battery case in an opened state, and a retracted position.

18. The auxiliary member for a hearing aid according to claim 16, wherein the cover has a magnet that attracts an air battery to an accommodating space side of the battery case.

19. The auxiliary member for a hearing aid according to claim 1, wherein the main body case further has a vent that communicates with the hearing aid accommodated in the hearing aid accommodating space.

20. An auxiliary member for a hearing aid, comprising:

a main body case having an insertion hole in a first face thereof, for inserting a hearing aid;

a hearing aid accommodating space provided to a portion corresponding to the insertion hole inside the main body case;

a holding member that holds the hearing aid accommodated in the hearing aid accommodating space;

an opening component that opens a battery case of the hearing aid accommodated in the hearing aid accommodating space; and a manipulation component with which the holding member is manipulated to switch between states in which the hearing aid is and is not held in the hearing aid accommodating space, wherein the opening component opens the battery case of the hearing aid accommodated in the hearing aid accommodating space after the holding member has been manipulated with the manipulation component.

21. The auxiliary member for a hearing aid according to claim 20, wherein the opening component is opened with the manipulation component.

22. An auxiliary member for a hearing aid, comprising:
a main body case having an insertion hole in a first face thereof, for inserting a hearing aid;
a hearing aid accommodating space provided to a portion corresponding to the insertion hole inside the main body case;
a holding member that holds the hearing aid accommodated in the hearing aid accommodating space;
an opening component that opens a battery case of the hearing aid accommodated in the hearing aid accommodating space; and
a manipulation component with which the holding member is manipulated to switch between states in which the hearing aid is and is not held in the hearing aid accommodating space,
wherein the holding member has a holding member sliding shaft,
the opening component has an opening component sliding shaft,
there is further provided a manipulation piece that links the manipulation component, the holding member, and the opening component, and that is provided inside the main body case,
and the manipulation piece has:
a first sliding groove that guides the sliding of the holding member sliding shaft; and
a second sliding groove that guides the sliding of the opening component sliding shaft.

23. An auxiliary member for a hearing aid, comprising:
a main body case having an insertion hole in a first face thereof, for inserting a hearing aid;
a hearing aid accommodating space provided to a portion corresponding to the insertion hole inside the main body case;
a holding member that holds the hearing aid accommodated in the hearing aid accommodating space;
an opening component that opens a battery case of the hearing aid accommodated in the hearing aid accommodating space; and
a manipulation component with which the holding member is manipulated to switch between states in which the hearing aid is and is not held in the hearing aid accommodating space,
wherein the manipulation component is provided rotatably on the first face of the main body case.

* * * * *